United States Patent
Zones et al.

(10) Patent No.: US 9,586,829 B2
(45) Date of Patent: Mar. 7, 2017

(54) MOLECULAR SIEVE SSZ-27

(71) Applicants: Stacey Ian Zones, San Francisco, CA (US); Dan Xie, Richmond, CA (US); Robert James Saxton, San Rafael, CA (US)

(72) Inventors: Stacey Ian Zones, San Francisco, CA (US); Dan Xie, Richmond, CA (US); Robert James Saxton, San Rafael, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 180 days.

(21) Appl. No.: 14/719,051

(22) Filed: May 21, 2015

(65) Prior Publication Data

US 2016/0340198 A1    Nov. 24, 2016

(51) Int. Cl.
*C01B 39/48* (2006.01)
*B01J 29/70* (2006.01)

(52) U.S. Cl.
CPC ............... *C01B 39/48* (2013.01); *B01J 29/70* (2013.01)

(58) Field of Classification Search
CPC .................................. C01B 39/48; B01J 29/70
See application file for complete search history.

(56) References Cited

U.S. PATENT DOCUMENTS

| | | | |
|---|---|---|---|
| 4,910,006 A * | 3/1990 | Zones | B01J 29/04 423/326 |
| 5,007,997 A | 4/1991 | Zones et al. | |
| 9,505,627 B1 * | 11/2016 | Zones | C01B 39/48 |
| 2016/0340198 A1 * | 11/2016 | Zones | B01J 29/70 |
| 2016/0340199 A1 * | 11/2016 | Zones | B01J 29/70 |

FOREIGN PATENT DOCUMENTS

WO    8909185    10/1989

OTHER PUBLICATIONS

Smeets, "Development of Hybrid Methods for Solving the Structures of Polycrystalline Materials", Diss. ETH No. 23043, Zurich (2015).*
International Search Report, International Appl. No. PCT/US2016/027437, mailed Aug. 18, 2016.
R.F. Lobo, M. Pan, I. Chan, R.C. Medrud, S.I. Zones, P.A. Crozier and M.E. Davis "Physicochemical Characterization of Zeolites SSZ-26 and SSZ-33" J. Phys. Chem. 1994, 98, 12040-12052.

* cited by examiner

*Primary Examiner* — David M Brunsman
(74) *Attorney, Agent, or Firm* — Terrance M. Flaherty

(57) ABSTRACT

A new crystalline molecular sieve designated SSZ-27 is disclosed. SSZ-27 is synthesized using a hexamethyl [4.3.3.0] propellane-8,11-diammonium cation as a structure directing agent.

7 Claims, No Drawings

MOLECULAR SIEVE SSZ-27

TECHNICAL FIELD

This disclosure relates to a new crystalline molecular sieve designated SSZ-27, a method for preparing SSZ-27, and uses for SSZ-27.

BACKGROUND

Molecular sieves are a class of important materials used in the chemical industry for processes such as gas stream purification and hydrocarbon conversion processes. Molecular sieves are porous solids having interconnected pores of different sizes. Molecular sieves typically have a one-, two- or three-dimensional crystalline pore structure having pores of one or more molecular dimensions that selectively adsorb molecules that can enter the pores, and exclude those molecules that are too large. The pore size, pore shape, interstitial spacing or channels, composition, crystal morphology and structure are a few characteristics of molecular sieves that determine their use in various hydrocarbon adsorption and conversion processes.

For the petroleum and petrochemical industries, the most commercially useful molecular sieves are known as zeolites. A zeolite is an aluminosilicate having an open framework structure formed from corner-sharing the oxygen atoms of [SiO$_4$] and [AlO$_4$] tetrahedra. Mobile extra framework cations reside in the pores for balancing charges along the zeolite framework. These charges are a result of substitution of a tetrahedral framework cation (e.g., Si$^{4+}$) with a trivalent or pentavalent cation. Extra framework cations counterbalance these charges preserving the electroneutrality of the framework, and these cations are exchangeable with other cations and/or protons.

Synthetic molecular sieves, particularly zeolites, are typically synthesized by mixing sources of alumina and silica in an aqueous media, often in the presence of an organic structure directing agent or templating agent. The structure of the molecular sieve formed is determined in part by the solubility of the various sources, the silica-to-alumina ratio, the nature of the cation, the synthesis conditions (temperature, pressure, mixing agitation), the order of addition, the type of structure directing agent, and the like.

Although many different crystalline molecular sieves have been discovered, there is a continuing need for new molecular sieves with desirable properties for gas separation and drying, hydrocarbon and chemical conversions, and other applications. New molecular sieves may contain novel internal pore architectures, providing enhanced selectivities in these processes.

SUMMARY

The present disclosure is directed to a new family of molecular sieves with unique properties, referred to herein as "molecular sieve SSZ-27" or simply "SSZ-27."

In one aspect, there is provided a crystalline molecular sieve having, in its calcined form, the X-ray diffraction lines of Table 3.

In another aspect, there is provided a method of preparing a crystalline molecular sieve by contacting under crystallization conditions (1) at least one source of silicon; (2) at least one source of aluminum; (3) at least one source of an element selected from Groups 1 and 2 of the Periodic Table; (4) hydroxide ions; and (5) hexamethyl [4.3.3.0] propellane-8,11-diammonium cations.

In yet another aspect, there is provided a process for preparing a crystalline molecular sieve having, in its as-synthesized form, the X-ray diffraction lines of Table 2, by: (a) preparing a reaction mixture containing (1) at least one source of silicon; (2) at least one source of aluminum; (3) at least one source of an element selected from Groups 1 and 2 of the Periodic Table; (4) hydroxide ions; (5) hexamethyl [4.3.3.0] propellane-8,11-diammonium cations; and (6) water; and (b) subjecting the reaction mixture to crystallization conditions sufficient to form crystals of the molecular sieve.

The present disclosure also provides a novel molecular sieve designated SSZ-27 having, in its as-synthesized, anhydrous form, a composition, in terms of mole ratios, in the range: Al$_2$O$_3$: 20-80 SiO$_2$ or more preferably: Al$_2$O$_3$: 20-35 SiO$_2$.

DETAILED DESCRIPTION

Introduction

In preparing SSZ-27, a hexamethyl [4.3.3.0] propellane-8,11-diammonium cation is used as a structure directing agent ("SDA"), also known as a crystallization template. The SDA useful for making SSZ-27 has the following structure (1):

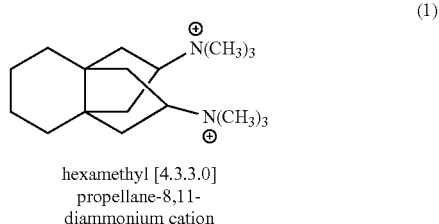

hexamethyl [4.3.3.0] propellane-8,11-diammonium cation including syn, syn; syn, anti; and anti, anti orientations of the ammonium groups.

The SDA dication is associated with anions which may be any anion that is not detrimental to the formation of SSZ-27. Representative anions include elements from Group 17 of the Periodic Table (e.g., fluoride, chloride, bromide and iodide), hydroxide, sulfate, tetrafluoroborate, acetate, carboxylate, and the like. As used herein, the numbering scheme for the Periodic Table Groups is as disclosed in *Chem. Eng. News*, 63(5), 27 (1985).

Reaction Mixture

In general, SSZ-27 is prepared by: (a) preparing a reaction mixture containing (1) at least one source of silicon; (2) at least one source of aluminum; (3) at least one source of an element selected from Groups 1 and 2 of the Periodic Table; (4) hydroxide ions; (5) hexamethyl [4.3.3.0] propellane-8,11-diammonium cations; and (6) water; and (b) subjecting the reaction mixture to crystallization conditions sufficient to form crystals of the molecular sieve.

The composition of the reaction mixture from which the molecular sieve is formed, in terms of mole ratios, is identified in Table 1 below

TABLE 1

| Components | Broad | Exemplary |
|---|---|---|
| SiO$_2$/Al$_2$O$_3$ | 20 to 80 | 20 to 35 |
| M/SiO$_2$ | 0.05 to 0.50 | 0.15 to 0.30 |

TABLE 1-continued

| Components | Broad | Exemplary |
|---|---|---|
| Q/SiO$_2$ | 0.10 to 0.40 | 0.10 to 0.30 |
| OH/SiO$_2$ | 0.25 to 0.60 | 0.25 to 0.50 |
| H$_2$O/SiO$_2$ | 10 to 60 | 20 to 50 | wherein Q is a hexamethyl [4.3.3.0] propellane-8,11-diammonium cation and M is selected from the group consisting of elements from Groups 1 and 2 of the Periodic Table.

Sources useful herein for silicon include fumed silica, precipitated silicates, silica hydrogel, silicic acid, colloidal silica, tetra-alkyl orthosilicates (e.g., tetraethyl orthosilicate), and silica hydroxides.

Sources useful for aluminum include oxides, hydroxides, acetates, oxalates, ammonium salts and sulfates of aluminum. Typical sources of aluminum oxide include aluminates, alumina, and aluminum compounds such as aluminum chloride, aluminum sulfate, aluminum hydroxide, kaolin clays, and other zeolites. An example of the source of aluminum oxide is zeolite Y.

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, acetates, oxalates, and citrates thereof.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the molecular sieve is prepared by: (a) preparing a reaction mixture as described herein above; and (b) subjecting the reaction mixture to crystallization conditions sufficient to form crystals of the molecular sieve (see, e.g., H. Robson, *Verified Syntheses of Zeolitic Materials*, Second Revised Edition, Elsevier, 2001).

The reaction mixture is maintained at an elevated temperature until the crystals of the molecular sieve are formed. The hydrothermal crystallization is usually conducted under pressure, and usually in an autoclave so that the reaction mixture is subject to autogenous pressure, at a temperature between 150° C. and 180° C., e.g., from 170° C. to 175° C.

The reaction mixture can be subjected to mild stirring or agitation during the crystallization step. It will be understood by one skilled in the art that the molecular sieves described herein can contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for silicon used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., Na$^+$) by ion exchange and replace it with hydrogen, ammonium, or any desired metal-ion. Particularly preferred cations are those which tailor the catalytic activity for certain hydrocarbon conversion reactions. These include hydrogen, rare earth metals and metals of Groups 2 to 15 of the Periodic Table of the Elements.

Where the molecular sieve formed is an intermediate material, the target molecular sieve can be achieved using post-synthesis techniques such as heteroatom lattice substitution techniques in order to achieve a higher SiO$_2$/Al$_2$O$_3$ ratio. The target molecular sieve can also be achieved by removing heteroatoms from the lattice by known techniques such as acid leaching.

The molecular sieve made from the process disclosed herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying or dried (or partially dried) and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

Characterization of the Molecular Sieve

SSZ-27 has, in its as-synthesized, anhydrous form, a composition, in terms of mole ratios, in the range: Al$_2$O$_3$: 20-80 SiO$_2$ or more preferably: Al$_2$O$_3$: 20-35 SiO$_2$.

Molecular sieves synthesized by the process disclosed herein are characterized by their X-ray diffraction (XRD) pattern. The product of the synthesis reaction is a crystalline molecular sieve containing within its pore structure hexamethyl [4.3.3.0] propellane-8,11-diammonium cations. The resultant as-synthesized material has an X-ray diffraction pattern which is distinguished from the patterns of other known as-synthesized or thermally treated crystalline materials by the lines listed in Table 2 below.

TABLE 2

Characteristic Peaks for As-Synthesized SSZ-27

| 2-Theta[a] | d-Spacing, nm | Relative Intensity[b] |
|---|---|---|
| 7.57 | 1.167 | W |
| 8.62 | 1.025 | W |
| 9.35 | 0.946 | M |
| 9.83 | 0.900 | W |
| 13.55 | 0.653 | W |
| 14.80 | 0.598 | W |
| 15.27 | 0.580 | W |
| 16.25 | 0.545 | W |
| 17.72 | 0.500 | W |
| 19.76 | 0.449 | M |
| 20.50 | 0.433 | W |
| 21.08 | 0.421 | S |
| 21.30 | 0.417 | M |
| 21.93 | 0.405 | S |
| 22.95 | 0.387 | VS |

[a]±0.20
[b]The powder XRD patterns provided are based on a relative intensity scale in which the strongest line in the powder X-ray pattern is assigned a value of 100: W = weak (>0 to ≤20); M = medium (>20 to ≤40); S = strong (>40 to ≤60); VS = very strong (>60 to ≤100).

The X-ray diffraction pattern of the calcined form of SSZ-27 includes the lines listed in Table 3 below:

TABLE 3

Characteristic Peaks for Calcined SSZ-27

| 2-Theta[a] | d-Spacing, nm | Relative Intensity[b] |
|---|---|---|
| 7.50 | 1.177 | W |
| 8.65 | 1.021 | W |
| 9.47 | 0.933 | VS |
| 9.94 | 0.889 | M |
| 13.47 | 0.657 | M |
| 14.86 | 0.596 | M |
| 16.07 | 0.551 | W |
| 16.37 | 0.541 | W |
| 17.92 | 0.495 | W |
| 19.92 | 0.445 | W |
| 20.66 | 0.430 | W |
| 21.14 | 0.420 | W |
| 21.34 | 0.416 | W |
| 22.07 | 0.402 | M |
| 23.17 | 0.384 | M |

[a]±0.20
[b]The powder XRD patterns provided are based on a relative intensity scale in which the strongest line in the powder X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Processes Using SSZ-27

SSZ-27 can be useful as an adsorbent for gas separations. SSZ-27 can also be used as a catalyst for converting oxygenates (e.g., methanol) to olefins and for making small amines. SSZ-27 can be used to reduce oxides of nitrogen in a gas streams, such as automobile exhaust. SSZ-27 can also be used to as a cold start hydrocarbon trap in combustion engine pollution control systems. SSZ-27 is particularly useful for trapping $C_3$ fragments.

EXAMPLES

The following illustrative examples are intended to be non-limiting.

Example 1

Synthesis of SSZ-27

1 mmole of the SDA in the OH form, in 2.5 g of water, was added into a Teflon liner for a 23 mL Parr reactor. Next, 2 g of 1 N NaOH solution was added, followed by 1 g of water, and Na—Y zeolite (CBV100, Zeolyst International, $SiO_2/Al_2O_3$ mole ratio=5.1) as the aluminum source. Finally, 0.60 g of CAB-O-SIL® M5 fumed silica (Cabot Corporation) was added. The liner was capped and placed within a Parr steel autoclave reactor. The autoclave was then fixed in a rotating spit (43 rpm) within an oven heated at 170° C. for 7-10 days. The solid products were recovered, washed thoroughly with deionized water and dried.

The resulting product was analyzed by powder XRD and indicated that the material is unique.

Example 2

Seeded Synthesis of SSZ-27

Example 1 was repeated with the exception that as-synthesized zeolite from Example 1 was added to the reaction mixture as seed material (2% of the weight of the silicon source). The crystallization was complete in 6-7 days, as confirmed by powder XRD.

Example 3

Calcination of SSZ-27

The as-synthesized product of Example 1 was calcined inside a muffle furnace under a flow of air heated to 595° C. at a rate of 1° C./minute and held at 595° C. for 5 hours, cooled and then analyzed by powder XRD. The powder XRD pattern of the resulting product indicated that the material remains stable after calcination to remove the organic SDA.

Example 4

Ammonium-Ion Exchange of SSZ-27

The calcined material from Example 3 (Na-SSZ-27) was treated with 10 mL (per g of zeolite) of a 1 N ammonium nitrate solution at 90° C. for 2 hours. The solution was cooled, decanted off and the same process repeated.

The product ($NH_4$-SSZ-27) after drying was subjected to a micropore volume analysis using $N_2$ as adsorbate and via the BET method. The zeolite exhibited a micropore volume of 0.11 cm/g and indicates that SSZ-27 has microporous character.

Example 5

Methanol Conversion

The product made in Example 4 was pelletized at 5 kpsi, crushed and meshed to 20-40. 0.25 g of catalyst (diluted 4:1 v/v with alundum) was centered in a stainless steel downflow reactor in a split tube furnace. The catalyst was preheated in-situ under flowing nitrogen at 400° C. A feed of 10% methanol in nitrogen was introduced into the reactor at a rate of 1.0 $h^{-1}$ WHSV.

Reaction data was collected using a plug flow and an Agilent on-line gas chromatograph with an FID detector. Reaction products were analyzed at 1 hour and 2 hours on an HP-PLOT Q column. The results are summarized in Table 4.

TABLE 4

| Product | 1 Hour Data | 2 Hour Data |
|---|---|---|
| Methane | 9.0 | 4.5 |
| Ethane | 13.3 | 2.2 |
| Ethylene | 13.5 | 33.8 |
| Propane | 3.3 | 11.9 |
| Propylene | 4.8 | 28.3 |
| Summed Butanes/Butenes | 11.5 | 13.5 |
| Summed Pentanes/Pentenes | 25.0 | 5.5 |

The products shown in Table 4 are consistent with those for a small pore zeolite in terms of product shape-selectivity in the reaction of methanol being catalytically converted to olefins of mostly $C_2$-$C_4$ size.

As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

All documents cited in this application are herein incorporated by reference in their entirety to the extent such disclosure is not inconsistent with this text.

The invention claimed is:

1. A crystalline molecular sieve having, in its calcined form, an X-ray diffraction pattern including the lines listed in the following table:

| 2-Theta | d-Spacing, nm | Relative Intensity |
|---|---|---|
| 7.50 ± 0.20 | 1.177 | W |
| 8.65 ± 0.20 | 1.021 | W |
| 9.47 ± 0.20 | 0.933 | VS |
| 9.94 ± 0.20 | 0.889 | M |
| 13.47 ± 0.20 | 0.657 | M |
| 14.86 ± 0.20 | 0.596 | M |
| 16.07 ± 0.20 | 0.551 | W |
| 16.37 ± 0.20 | 0.541 | W |
| 17.92 ± 0.20 | 0.495 | W |
| 19.92 ± 0.20 | 0.445 | W |
| 20.66 ± 0.20 | 0.430 | W |
| 21.14 ± 0.20 | 0.420 | W |
| 21.34 ± 0.20 | 0.416 | W |
| 22.07 ± 0.20 | 0.402 | M |
| 23.17 ± 0.20 | 0.384 | M. |

2. The molecular sieve of claim 1, wherein the molecular sieve has a $SiO_2/Al_2O_3$ mole ratio of from 20 to 80.

3. The molecular sieve of claim 1, wherein the molecular sieve has a $SiO_2/Al_2O_3$ mole ratio of from 20 to 35.

4. A crystalline molecular sieve having, in its as-synthesized form, an X-ray diffraction pattern including the lines in the following table:

| 2-Theta | d-Spacing, nm | Relative Intensity |
|---|---|---|
| 7.57 ± 0.20 | 1.167 | W |
| 8.62 ± 0.20 | 1.025 | W |
| 9.35 ± 0.20 | 0.946 | M |
| 9.83 ± 0.20 | 0.900 | W |
| 13.55 ± 0.20 | 0.653 | W |
| 14.80 ± 0.20 | 0.598 | W |
| 15.27 ± 0.20 | 0.580 | W |
| 16.25 ± 0.20 | 0.545 | W |
| 17.72 ± 0.20 | 0.500 | W |
| 19.76 ± 0.20 | 0.449 | M |
| 20.50 ± 0.20 | 0.433 | W |
| 21.08 ± 0.20 | 0.421 | S |
| 21.30 ± 0.20 | 0.417 | M |
| 21.93 ± 0.20 | 0.405 | S |
| 22.95 ± 0.20 | 0.387 | VS. |

5. The molecular sieve of claim 4, wherein the molecular sieve comprises hexamethyl [4.3.3.0] propellane-8,11-diammonium cations within its pore structure.

6. The molecular sieve of claim 4, wherein the molecular sieve has a $SiO_2/Al_2O_3$ mole ratio of 20 to 80.

7. The molecular sieve of claim 4, wherein the molecular sieve has a $SiO_2/Al_2O_3$ mole ratio of from 20 to 35.

* * * * *